(No Model.)  6 Sheets—Sheet 1.

J. R. BRIDGES.
MACHINE FOR MANUFACTURING GLASSWARE.

No. 557,105. Patented Mar. 31, 1896.

WITNESSES:
Ralph Daub
W. H. Flender

INVENTOR
John R. Bridges
BY O. D. Levis
ATTORNEY.

(No Model.) 6 Sheets—Sheet 2.

J. R. BRIDGES.
MACHINE FOR MANUFACTURING GLASSWARE.

No. 557,105. Patented Mar. 31, 1896.

Fig. 2.

WITNESSES:
Ralph Daub
W. H. Flender

INVENTOR
John R. Bridges
BY O. D. Levis
ATTORNEY.

(No Model.) 6 Sheets—Sheet 3.

J. R. BRIDGES.
MACHINE FOR MANUFACTURING GLASSWARE.

No. 557,105. Patented Mar. 31, 1896.

Fig. 3.

WITNESSES:
Ralph Daut
W. H. Flender

INVENTOR
John R. Bridges
BY O. D. Levis
ATTORNEY.

(No Model.)

J. R. BRIDGES.
MACHINE FOR MANUFACTURING GLASSWARE.

No. 557,105. Patented Mar. 31, 1896.

WITNESSES:
Ralph Daub
W. H. Filender

INVENTOR
John R. Bridges
BY O. D. Levis
ATTORNEY.

UNITED STATES PATENT OFFICE.

JOHN R. BRIDGES, OF FINDLAY, OHIO.

MACHINE FOR MANUFACTURING GLASSWARE.

SPECIFICATION forming part of Letters Patent No. 557,105, dated March 31, 1896.

Application filed June 10, 1895. Serial No. 552,264. (No model.)

*To all whom it may concern:*

Be it known that I, JOHN R. BRIDGES, a citizen of the United States, residing at Findlay, in the county of Hancock and State of Ohio, have invented certain new and useful Improvements in Machines for Manufacturing Glassware; and I do hereby declare the following to be a full, clear, and exact description of the invention, such as will enable others skilled in the art to which it pertains to make and use the same, reference being had to the accompanying drawings, which form a part of this specification.

This invention relates to certain new and useful improvements in the manufacture of glassware, and relates more particularly to a machine for fire polishing and finishing pressed glassware.

The aim of the present invention is to construct and design a machine specially adapted for manufacturing stemmed articles of glassware.

The invention has for its object the provision of novel means whereby the cost of manufacturing glassware of the above-referred-to class is greatly reduced; furthermore, to provide an article of superior grade that will possess advantages in points of durability and highly-polished surface.

The invention has for its further object the provision of novel means whereby it is possible to heat simultaneously both the bowl and foot of a goblet or like vessel; furthermore, to finish simultaneously the bowl and foot.

The invention has for its still further object to design a machine that will be simple in its construction and comparatively inexpensive to manufacture.

With the above and other objects in view the invention finally consists in the novel construction, combination, and arrangement of parts to be hereinafter more particularly described, and specifically pointed out in the claims.

In describing the invention in detail reference is had to the accompanying drawings, forming a part of this specification, and wherein like letters and figures of reference indicate similar parts throughout the several views, in which—

In the drawings, A is the circular plate fastened by a set-screw 1 to the central column F. On the outer edge of the said circular plate A is a semicircular flue E lined with iron plates or properly-shaped burned fire-clay bricks in sections, or any other fire-resisting material, as shown by the letter Y. At properly-selected intervals around and in the flue E are circular burners S, each having a series of small apertures $b\ b$ around the outer edge, and drilled at an angle inclined toward the center in order that the flame may impinge onto the outer surface of the glass as it issues from the apertures. The burner S is provided with a central bore $c$, from which the flame is directed to the inside of the glass cup-foot $d'$ of the goblet U. The burner S is fed by a pipe, being supplied with gas from the semicircular pipe V, all other burners in the flue E being connected in like manner with the pipe V. The pipe V is closed at one end, gas and air being introduced at the opposite end N, as shown on same sheet. The burners S can be raised or lowered to suit the different lengths of cups by turning the nut V' on the thread on the column F, which nut communicates its movement up or down to the collar to which the arms T are cast. These arms extend out to and over the pipe V, and are connected thereto by the yokes $e\ e$ shown.

B is a circular flat ring resting and removable on the flange of the collar B', which collar is held to and in position on column F by suitable set-screws $f\ f$. Fastened to the top B' by small bolts is a circular ring $d$, which extends over the inner edge of the ring B, thereby holding the same in place, yet allowing the said ring B to revolve when necessary. Fastened to the upper surface of the said ring B is a series of "snap-arms" whose outer ends extend over the edge of the said ring B, and which are marked G and G', the arm G being securely fastened to the ring B by bolts, while G' is hinged on a pin 10. In the parts of G and G' which extend over the edge of the ring B is bored a circular opening $g$, one-half in each, into which the jaws H and H', also in halves, are placed and held by pins $h\ h$. These jaws H and H' are bored out in the center to fit the stem of the goblet they are designed to hold. It is to be understood that different shaped and sized goblets will require a different set of jaws H and H', so that when the molds are changed on the press to make a different goblet the proper set of jaws H must be inserted in the arms G and G'. The tops of the jaws H are turned the proper angle of the foot of the goblet they are to hold, so that the foot, when opened on them, will cool without losing the proper shape.

The reference-letter U represents the glass goblet, the leg or stem shown in the jaws H, with the cup or foot uppermost, and the bowl extending downwardly. On the right, referring to Fig. 1 of the drawings, it is shown as it comes from the mold and as it is when first placed in the machine, and this shape it maintains while going through the flues and is being heated and fire-polished. On the left, referring to the above drawing, it is shown as having been finished to shape by the finishing-tools, the foot flattened, and the bowl "cupped." The tools are shown in final position, ready to be withdrawn.

The reference-letter C indicates a plate having a collar surrounding the central column F and carrying on its outer edge the lower flue D. Under the said collar C is a nut 18 provided with arms by which it may be turned on the thread on the lower end of the column F. As the legs or stems of the different goblets to be finished are not of the same length, it is obvious that the jaws H will have to be of corresponding lengths, to suit the lengths of the stems of the goblets they are designed to hold. This being the case, it is therefore necessary that a means be provided whereby the top edges of the slot or opening in the flue D, through which the goblet passes in its intermittent movement through flue D, shall in every case be brought in close proximity to the lower surface of the jaws H. This adjustment of the flue D is accomplished by the turning of the nut 18 on the thread 20 of the column F. A key $f'$ is fitted into the column F, and a corresponding keyway in the collar of the plate C permits of the plate C being raised or lowered, but prevents any lateral motion.

Figure 2:
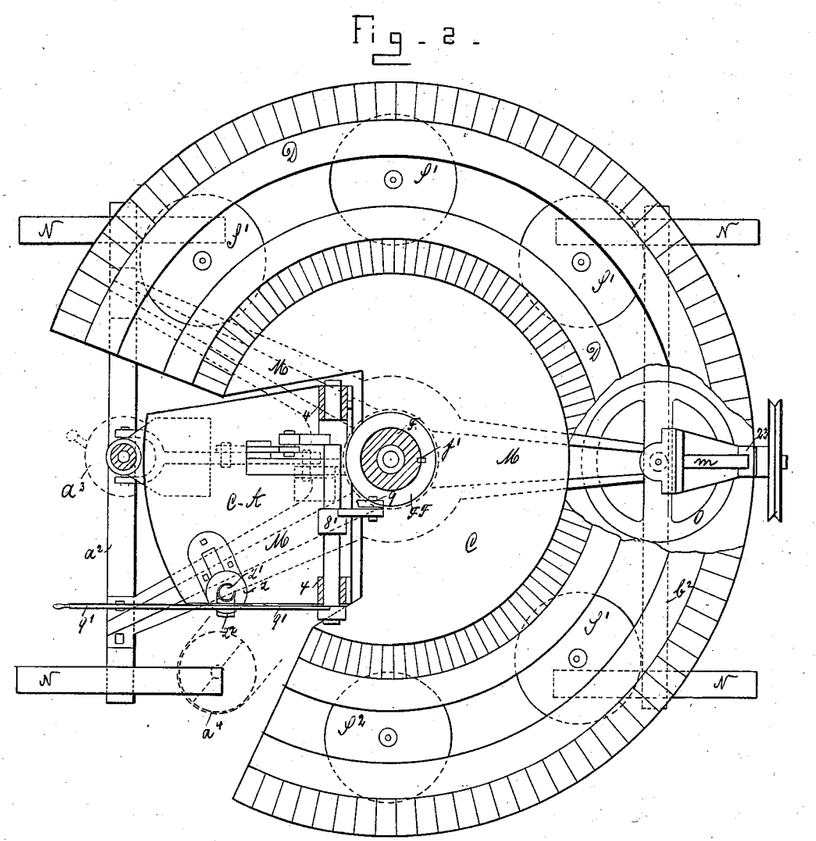
Fig. 2 is a horizontal sectional view on the line X Y Z of Fig. 1.

A large section of the plate C between the ends of the flue D is left open, and in this space is arranged a plate C A, as shown in Fig. 2 of the drawings. The said plate C A is held in place by a collar F F and set-screws encircling the column F. This collar F F is considerably above the line of the upper surface of the plate C A, but is connected to the same by a small section of the collar extending down to the plate and strengthened by a web reaching from the collar to a point near the center of the length of the plate. This plate C A carries the mechanism which finishes the bowl of the goblet and is made independent of the plate C for the reason that it is necessary to adjust the flue D at any time without disturbing the finishing-tools and their connections.

The burners S' in flue D are in number, position, and construction the same as the burners S in the upper flue E, with the exception that they are larger to suit the difference in the relative sizes of the bowl and cup, and instead of the burners being suspended from the pipe V, as are S, the burners S' project upwardly from the pipe W. The burners S' are raised and lowered by the nut 17 under the collar of the extended arms T'. This nut 17 turns on the thread 19 arranged on the collar of the plate C. Air and gas are admitted to the pipe W at the end shown on the left at $n'$.

I do not wish to limit myself to any particular fuel. Any form of gas may be used— natural or artificial—benzin, or gasolene. The air is to be at a necessary pressure to produce the best results in combustion or which will produce the hottest flame. I prefer to use a short intense blue flame, which will soften and glaze the surface of the glass, and not such a mass of flame as is used in the ordinary "glory-hole."

The column F is fastened and supported in an opening bored in the center of the legs M, the feet of which rest upon and are bolted to the axle $a^2\ b^2$. Under the said axle is arranged a horizontal shaft $X^2$. Upon the outer end of said shaft is fastened the driving-pulley $b$. The axle $X^2$ is supported by bearings 23 24 and X X being supported and connected to the collar X', which is fastened by a set-screw to the lower end of the column F. On the right-hand end of the axle $X^2$ is fastened a pulley $t$, which by a belt $t'$ passes over idle-pulleys $u'$, and around pulley $k$ revolve the bowl-finishing tools.

On the shaft $X^2$, against the bearing X, is a bevel-gear 22 meshing with the gear 21.

Figures 5, 6, 7, 8, 9, 10:
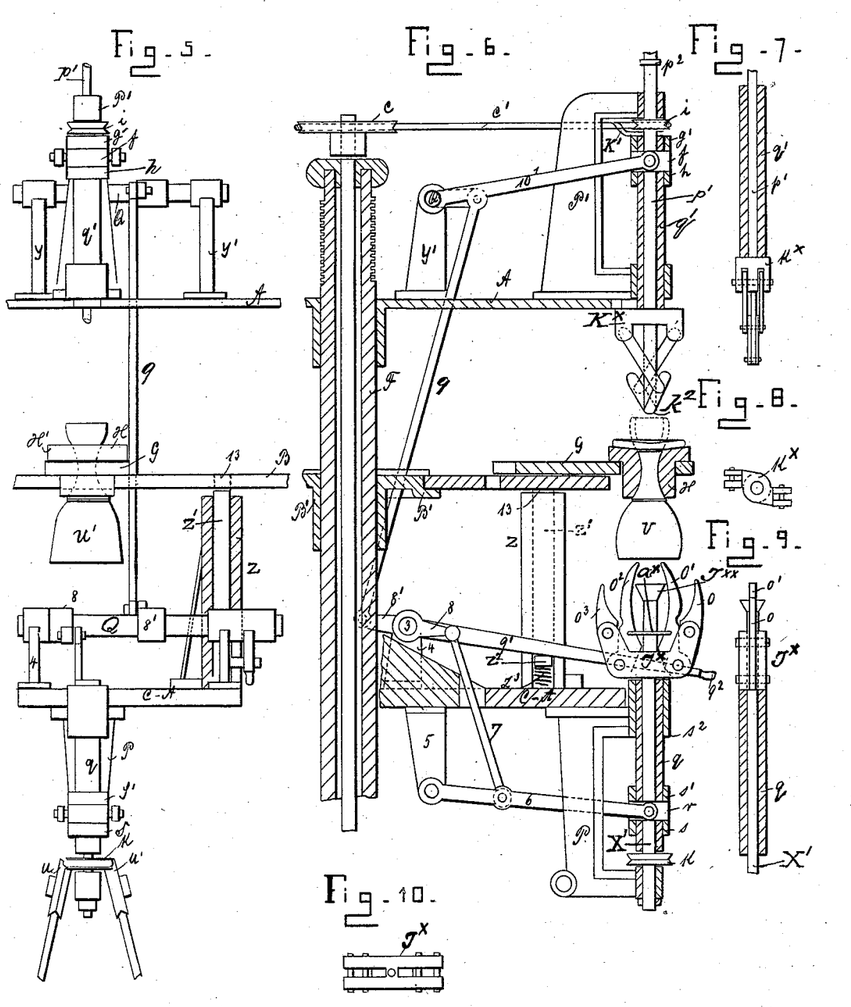
Fig. 5 is a front view of the finishing mechanism.
Fig. 6 is a right-hand side view of the same.
Fig. 7 is a detail vertical sectional view of the foot-finishing mechanism.
Fig. 8 is an underneath plan view of the head K.
Fig. 9 is a detail vertical sectional view of the bowl-finisher and shaft.
Fig. 10 is an underneath plan view of the bowl mechanism.

The latter revolves the perpendicular shaft L, on the upper end of which is arranged the pulley c, Fig. 6, which through the belt $c'$ revolves the pulley $i$ and in turn revolves the foot-finishing mechanism.

Figure 1:
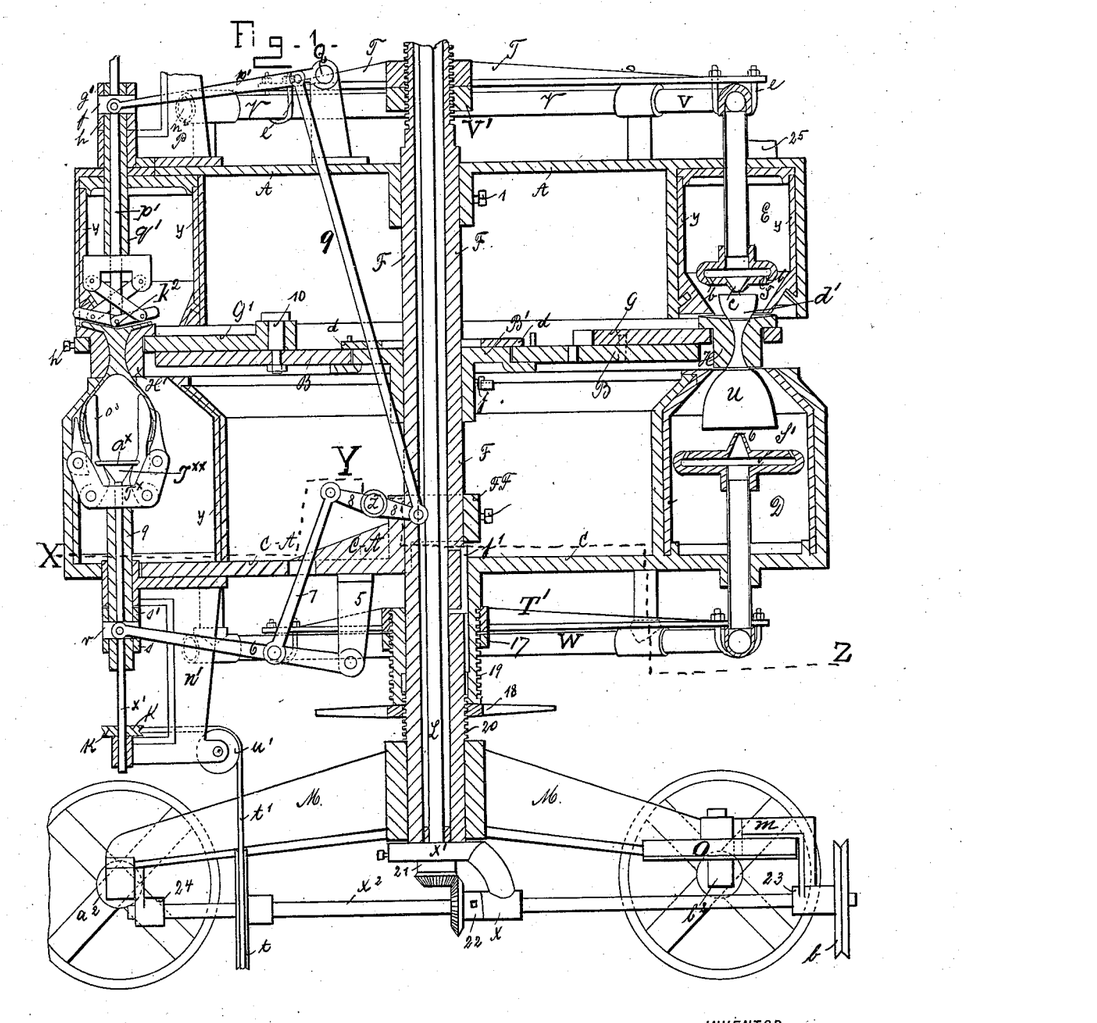
Figure 1 is a vertical sectional view of my improved machine.

The flues E and D, referring to Fig. 1 of the drawings, are shown as containing linings $y$. These may be iron plates in sections, or sections of burnt clay or any non-combustible material, or they may be dispensed with altogether, as experience or necessity dictates. The hot gases arising from the combustion-chamber of the gases in flue D will rise and escape from it through the slot formed in its top and between the arms G and $G'$, and will enter the flue E through the slot in its underneath side, and will finally escape through the openings in the top marked 25. (More clearly shown in Fig. 4 of the drawings.) Short sheet-iron pipes may be attached to these openings to carry the gases above the heads of the workmen.

Referring to Fig. 2 of the drawings, illustrating the plates C A and C and flue D and showing the positions of the burners $S'$, part of flue D is cut away, showing the axle $b^2$ with the attached bearings of the shaft $X^2$. The operator stands at a convenient point and operates the finishing mechanism with the lever $9'$. The six burners are placed apart at what would be the one-eighth of the circle in which they are arranged, two being left off, one at the point where the finishing-tools operate and the other at the point where the articles are inserted and removed from the jaws H and $H'$. I do not wish to limit myself to any particular number of burners. More may be used in the machine, and means may be applied for shutting off any desired number. Underneath the plates C A and C the dotted lines indicate the three legs extending from the center, in which stands the column F. Two of the legs rest upon the axle $a^2$ and one upon the axle $b^2$. Over the fifth-wheel O is shown the angle $m$ of bearing 23, being bolted to the said wheel O.

$z$, $z'$ and $z^2$ show the stop-pins, one having its foot under the lever $9'$, by which the plate B and the jaws H and $H'$ are stopped and held centrally over and under the finishing-tools, at the same time each article of glass in the flues E and D is retained over or under a burner.

The operation of the machine can be described from Fig. 2 of the drawings.

The dotted lines $a^3$ and $a^4$ represent the points over which stand the jaws H and $H'$ when the plate B is held in position by the latch-pin $z'$ being in the aperture 13 of the plate B. It is to be supposed that there are no goblets in the machine. The operator takes a goblet just pressed, and with suitable pincers places it in the jaws H and $H'$ at $a^4$ by seizing the knob on the arm $G'$ and pulling it open, and after placing the goblet in the opposite jaw allowing it to close. Then by placing his hand on the handle of lever $9'$ he may by pressing downwardly depress the foot $z^2$ of pin $z'$ and thus release the plate B from the pin. Having done this, he reaches and grasps the knobs on the arms at the point $a^3$ and then revolves the plate B until this point reaches $a^4$, when, the pressure on the foot $z^2$ being relieved previously by the operator having removed his hand from the handle of lever $9'$, the pin $z'$ will slip up into the proper aperture 13 and stop plate B at the exact point required. The first goblet is then over the burner at $S^2$. This operation is repeated until the goblet first placed in the jaws H comes out of the flues E and D and stops at the point $a^3$, immediately under and over the finishing-tools, which, having been revolved continually, are, by the operator grasping the handle of the lever $9'$ and elevating it, brought into contact with the glass, and the foot and bowl finished simultaneously. The lever is then returned to its normal position and the tools withdrawn from the glass. Before moving the plate B a goblet is placed in the still empty jaws at $a^4$. Then the plate B is again moved, as before described, and another goblet comes from the flues, which is then finished, after which the operator removes the goblet previously finished at the jaws $a^4$ and inserts another just pressed. Then the plate B is moved, the goblet coming under the tools at $a^3$ is finished, and the one at $a^4$ is removed, another just pressed replaced, and so on, the operation being continued.

Figure 3:
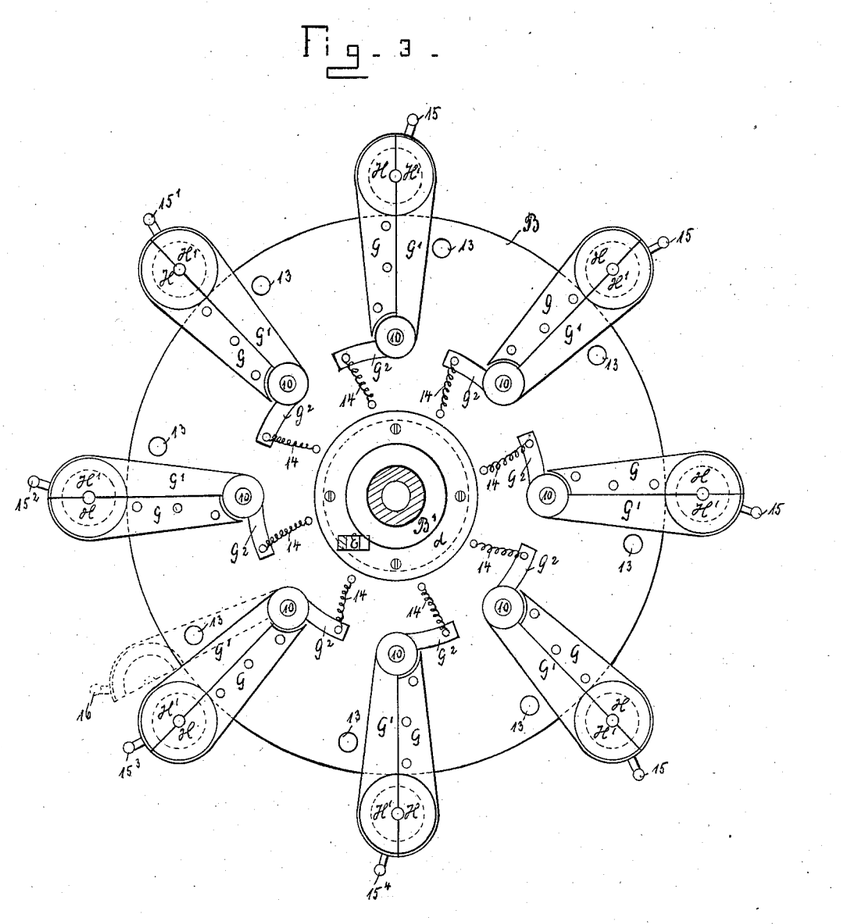
Fig. 3 is a top plan view of the plate B and its attachments.

In Fig. 3 of the drawings are shown the circular plate B, the flanged collar $B'$ and the small ring-plate $d$, between which and the flange of $B'$ the plate B revolves when desired. On the top of the said plate B are shown the arms G and $G'$, the arm G being bolted to the plate B, and the arm $G'$ secured by means of a pivot 10, on which it is free to swing when opened by the operator for the purpose of removing or inserting an article in the jaws H and $H'$. The latter are shown resting in the circular openings illustrated by the dotted lines on the outer ends of the arms G and $G'$. The knob-pins 15 on the outer ends of the arm $G'$ serve as means for the operator to revolve the plate B when the stop-pin $z'$ is withdrawn from the hole 13 in the plate B. Point $15'$ is where the last burner is situated, $15^2$ where the article is finished, $15^3$ where it is removed and one just pressed inserted, and $15^4$ shows where the first burner is located. The dotted lines at 16 show one of the arms, $G'$, open. $G^2$ is a part of the casting $G'$, having near its end a pin, over which the eye in the end of the spring 14 is passed. The other end of the spring is attached similarly to a pin on the plate B, and a sufficient tension is put on the spring to cause the arm $G^2$ to close and hold firmly the article in the jaws H and $H'$. The arm $G'$ is opened to remove or insert an article by the operator grasping the knob $15^3$ and removing it to the point 16, when it will be in the position illustrated by the dotted lines.

Figure 4:
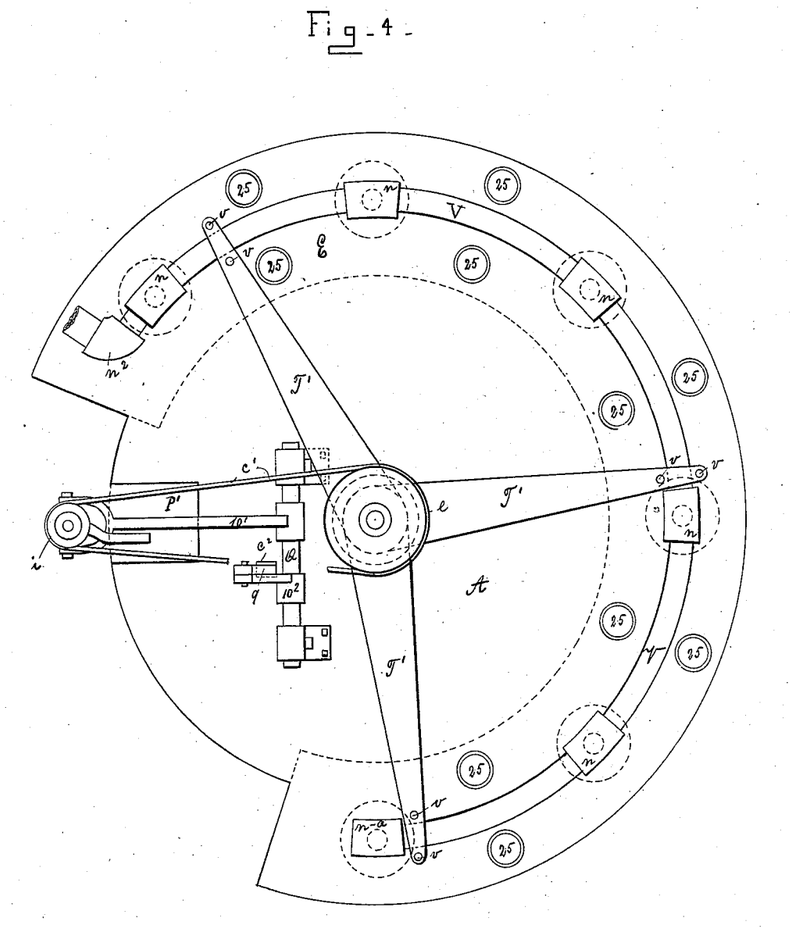
Fig. 4 is a top plan view of the plate A.

Referring to Fig. 4 of the drawings, E represents a flue provided with openings 25, through which the burned gases escape. On the pipe V, $n\,a$ shows the closed end of the pipe, and $n^2$ represents the open end where the air and gas are admitted to the pipe. The flue E is the same length as the flue D and the burners are in the same relative position. The plate A, after being once placed in position on the column F, is not moved to make any adjustments. The finishing mechanism is placed on its upper surface, and there fastened.

Referring to Figs. 5 and 6 of the drawings, showing in detail the finishing mechanism, the lower portion of Fig. 6 represents the bowl-finisher and the top portion of said figure illustrates the foot-finisher. The bowl-finisher revolves in two bearings in a casting P, that is bolted to the plate C A and is revolved by a belt $t'$ passing over pulley $t$ on the shaft $X^2$, Fig. 1, and then over the idle-pulleys $u'$ and around the pulley $k$, the said pulley $k$ being attached permanently to the inner shaft $X'$. On said shaft $X'$ is a hollow shaft $q$, on the upper end of which is the slotted head $T^\times$, and pinned in the slots of said head are the blades $o\,o'\,o^2\,o^3$. The blades $o'$ and $o^2$ are pressed inwardly or together by a spring $a^\times$, and the blades $o$ and $o^3$ are thrown outwardly by the revolution of the head J. On the lower inner surface of the hollow shaft $q$ is a key permanently attached thereto, which is free to slide up and down in the keyway on the shaft $X'$. (Shown in Fig. 9 of the drawings.) On the hollow shaft $q$ is the trunnion-collar $r$. Above and below it are the collars $s$ and $s'$, held in place on the hollow shaft $q$ by means of set-screws. To the trunnions on collar $r$ is loosely attached the yoke on the end of arm 6. From this arrangement it will be seen that the pulley $k$ will revolve all parts except the collar $r$ and that any up or down motion of the arm 6 will be communicated to the shaft $q$ and the head $T^\times$ and its blades. Now on the lever $9'$ being elevated by the operator grasping the handle $9^2$ and lifting it, the motion will be given to the shaft 3, and by it to the arm 8, and through the rod 7 to the arm 6. The collar $r$ will then lift collar $s'$ and with it shaft $q$ and head $T^\times$, and, as $T^\times$ moves up, the blades $o'$ and $o^2$ will enter the inside of the goblet U, and as soon as the inner edges of the blades $o'$ and $o^2$ come in contact with the bevel-head $T^{\times\times}$ on the upper end of the shaft $X'$ they will begin to open, and as they begin to open they will press against the toes on the lower end of the blades $o$ and $o^3$, which will cause them to close inwardly at their upper ends. These motions are continued until the collar $s'$ reaches the bearing $s^2$, when it will be completed and the goblet the shape desired.

In Fig. 1 I have shown the tools in their final position in and on the goblet-bowl. Simultaneously with this the arm $8'$ was depressed on its end connecting with the rod 9. Rod 9, following, brings down the end of arm $10'$. This revolving slightly the shaft Q, Figs. 5 and 6, correspondingly depresses the end of the arm $10'$, on which is the yoke attached to the trunnioned collar $f$, above and below which are the collars $h$ and $g'$, Figs. 1 and 6, which are fixed tightly to hollow shaft $q'$ by set-screws. Shaft $q'$, Fig. 5, has a key in its upper end which fits in a keyway in shaft $p'$. Pulley $i$ has also a key which slides in the same keyway and is revolved by the belt $c'$ from pulley $c$. Under pulley $i$ is a plate $K'$, which holds pulley $i$ in place when the shaft moves down.

On the end of shaft $q'$ is the head $K^\times$ carrying the crossed blades. Now as the arm $10_l$ is depressed, both shafts $q'$ and shaft $p'$ descend at the same time; but as soon as the point marked $k^2$ reaches the glass in the center of the cup, not quite touching it, the collar $p^2$ on the upper end of shaft $p'$ rests on the bearing on the upper end of the casting $P'$ and stops the further downward motion of shaft $p'$ and also the point $k^2$; but shaft $q'$ and head $K^\times$ continue to descend, which causes the crossed blades to assume a more horizontal position to each other, which continues until the two lower blades reach the angle desired, when the foot of the goblet is finished.

In Fig. 1 are shown the mechanism and blades in final position, and in Fig. 6 they are shown as being just withdrawn. The construction and connections will show that the bowl and foot are finished simultaneously.

The goblet U is finished to what is called "cupped" shape, this being but one of many shapes, each of which will require its own particular tool or shaper.

As before stated, the concavity on the upper surface of the jaws H and H' will always be the angle to which it is desired the foot shall be finished, and the revolutions given the finishing-tool shall be quite rapid, not less than one hundred or one hundred and fifty per minute.

The column $z$ is bolted to the plate C A, in the center of which is the stop-pin $z'$, Figs. 2, 5, and 6, on the lower end of which is the foot $z^2$, extending through an opening in the side and lower end of the column $z$. Under this foot and in the center of the column is the spring $z^3$, whose function is to force the pin $z'$ into the holes 13 in plate B as they are presented to it in succession. A slight downward pressure of the lever $9'$ being communicated to the foot $z^2$ serves to withdraw the pin from the hole 13.

Figures 11, 12, 13, 14, 15, 16, 17, 18, 19, 20, 21, 22, 23:
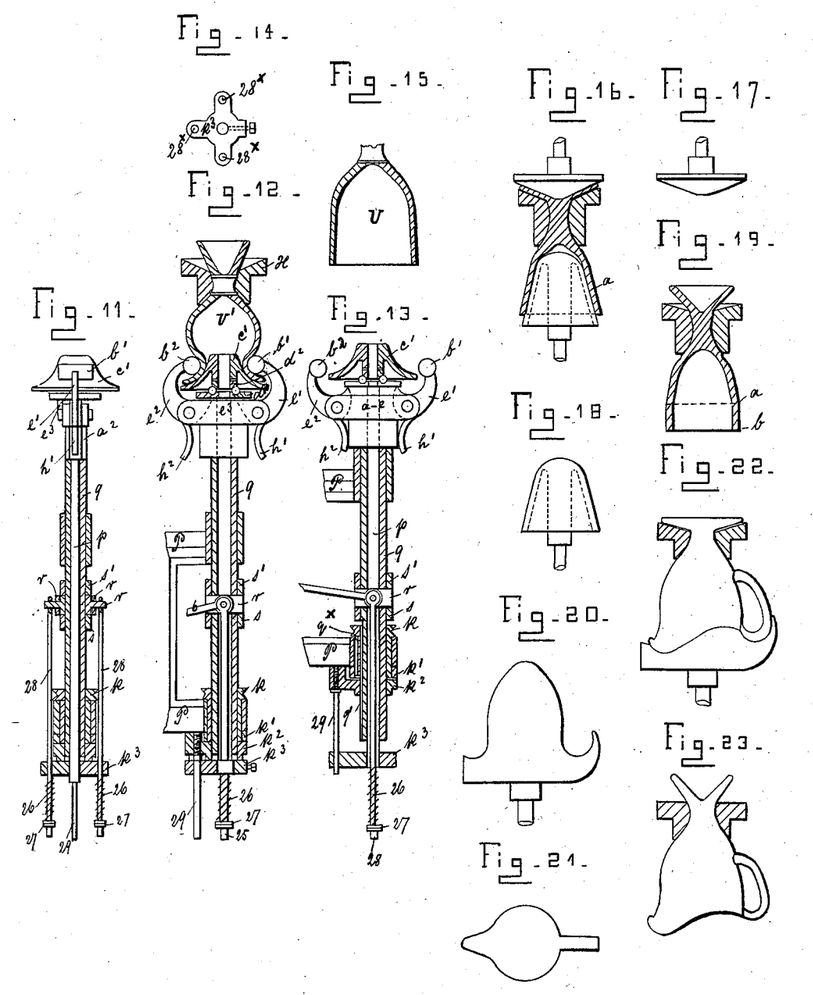
Figs. 11, 12, and 13 are vertical sectional views of the bowl-finishing mechanism. Fig.
Fig. 14 is a plan view of the plate K.
Fig. 15 is a sectional view of the bowl unfinished.
Fig. 16 is a vertical sectional view showing the former entering the glass.
Fig. 17 is a side elevation of the foot-setter.
Fig. 18 is a front elevation of the tapered former.
Fig. 19 is a vertical sectional view of the unfinished goblet held by the snap or clamp.
Fig. 20 is a side view of a modification of the former.
Fig. 21 is a top plan view of the same.
Fig. 22 is a front elevation showing the former applied to a glass.
Fig. 23 is a vertical sectional view of a glass and snap, showing the foot and bowl unfinished.

Figs. 11, 12, and 13 are three views of a bowl-finishing mechanism for articles that are required to be finished straight, taper, or flared, before describing which it may be well to state that in finishing hot glass no large surface of it should be touched at the same instant by any metal tool moving at any considerable speed, for the reason that it will destroy the polish of the surface of the glass. Wet wood or metal that has a thin covering of a composition of ground cork, linseed-oil, &c., kept constantly wet may be brought into contact with hot glass with impunity without injuring the surface of the same, no matter at what speed the glass or the wet wood or covered metal may be revolved. This being true of tools, formers, or shapers in motion, it is also true that an article of glass very hot may be placed upon a metal former at rest without harm to the glass if the former is not too cold and has been slightly greased with beeswax. With this preliminary explanation it will be at once evident that the finisher about to be described will meet the requirements in finishing a great many articles of glassware.

The arrangement of the collars $r$, $s$, and $s'$ and shafts $p$ and $q$ is the same as in the previously-described bowl-finisher, with the exceptions that they are longer and that $q$ ascends and descends through the pulley $k$, which pulley has a hub sufficiently long to pass through the bearing on the lower part of casting P, in which it revolves, being retained in position by a collar $k'$ and set-screw. In the pulley $k$, fastened permanently, is the key $q^\times$. On extreme lower end of shaft $p$ is part $k^3$, fastened securely by a set-screw. A top view of $k^3$ is shown over Fig. 12. Suspended from the trunnions or collars $r$ are two rods 28, Fig. 11, which pass through holes $28^\times$ in the part $k^3$, between which and the jam-nuts 27 are the springs 26. $k^2$ fits closely around shaft $q$ under the hub of pulley $k$, but not touching it, and secured tightly to the casting P by the pin 29, the end of which is threaded and screwed into P, a collar at the proper distance from the end serves to hold the part $k^2$ securely. When the pin is screwed into P, the lower end of the pin 29 passes through a hole in the part $k^3$, which part slides freely up and down on the pin. On the upper end of the shaft $q$ is the head $a\,e$, which is slotted to receive the blades $e'\,e^2$, upon the upper ends of which are the round short bars $b'\,b^2$. On the lower part of $e'$ and $e^2$ are the extensions $h'$ and $h^2$. On the top of the shaft $p$ is the former or shaper $c'$, under the collar of which is the collar $d^3$ pinned to the shaft $p$. Under $d^2$ is the circular plate $d'$, which fits loosely on the shaft $p$. Between $d'$ and $d^2$ are small steel balls for the purpose of making a frictionless bearing.

The tool operates as follows: When the collar $r$ is elevated, every part of the apparatus is also elevated, except the part $k^2$ and the pin 29. As the parts rise, the former $c'$ enters the glass U, causing the lower edge of it to flare outwardly. Owing to the part $k^2$ sliding over the pin 29, it is prevented from revolving, and being securely fastened to the shaft $p$ it is also held from turning, and as $d^2$ and $c'$ are attached to $p$ it follows they do not revolve. As soon, however, as the part $k^3$ in its upward movement comes in contact with the part $k^2$, it stops and with it shaft $p$. At this point $c'$ has entered and flared the edge of the glass U sufficiently, and having stopped entering the glass remains motionless, while the shaft $q$ continues to revolve and ascend, this being made possible by the rods 28 and jam-nuts on their lower end compressing the springs 26, thus allowing the trunnioned collar $r$ to still elevate the shaft $q$, which carries with it the head $a\,e$, and causing the toes of blades $e'$ and $e^2$ to bear against the under surface of the plate $d'$, which plate is caused to revolve also by the pin $e^3$ bearing against the side of the head $a\,e$. As the head $a\,e$ still further ascends, the toes are correspondingly depressed, throwing inwardly the bars $b'$ and $b^2$ until they assume the final position, (shown in Fig. 12,) the glass then having been finished to the shape shown at U'. On the retraction of the tools the blades $e'$ and $e^2$ will first open until the parts $h'$ and $h^2$ touch the wings on the lower side of the head $a\,e$, when the whole tool will descend to its lowest position. The springs 26 are set with sufficient compression to force the former $c'$ into the glass without altering the relative positions of the two shafts, which will not be altered until the part $k^3$ strikes $k^2$.

A taper-shaped former is shown in Fig. 18, which will enter the glass, as shown at Fig. 16. The angle at $a$ in Fig. 19 will be pressed down by rubbers $b'$ and $b^2$, Fig. 13, which will be flat to conform to the shape of the taper-bowl of the article. Fig. 17 shows a form of foot-setter that is designed to simply press the half-cup foot shown under it down flat, as shown in Fig. 16. It is not intended to revolve this foot-setter, as to do so would spoil the surface of the glass.

A former is shown at Fig. 20 that is not new, having been used heretofore by placing the glass held in the snap upon the former, suitable guides for snap-rod being provided. In my invention the glass having been pressed the shape shown at Fig. 23, it is placed in the machine, the handle and lip being always placed in the same position, which may easily be done by selecting one of the joint-marks on the glass as a guide and placing it in a line with the joint of the jaws H and H' and then setting the former in the finishing-tool accordingly, which tool will not be revolved, but simply raised and lowered. By slacking the springs 26, removing the blades $e'$ and $e^2$, and throwing off the belt revolving, Fig. 13, and securing the former, Fig. 20, to the top end of the shaft $p$ is all that is necessary to apply it to use.

Having fully described my invention, what I claim as new, and desire to secure by Letters Patent, is—

1. In a machine for the manufacture of glassware, the combination of opposed heaters and opposed mechanism for finishing the foot and bowl of a glass vessel, and a holder for said vessel arranged to revolve between said heaters and finishing mechanism, to heat both said foot and bowl simultaneously and to simultaneously finish both foot and bowl, substantially as set forth.

2. The combination of the jaws H, H', the plate B having a pin-aperture, arms G, G', lever 9', pin Z' and suitable burners, substantially as set forth.

3. The combination of the jaws H, H', the flues E, D, the burners arranged in said flues, above and below said holders or jaws and opposite each other, the plate B carrying the arms G G' provided with the jaws H H', said plate having a pin-aperture, lever 9' and pin Z' adapted to be operated on by said lever, substantially as described.

4. In a machine for shaping or finishing glassware, a holder for article operated on adapted to be revolved, tools adapted to shape or finish simultaneously both the foot and bowl of said article, mechanism for moving said tools to and from article simultaneously, and means for heating said article, substantially as set forth.

5. In a machine for shaping or finishing glassware, revoluble holder for article operated on, a plate supporting said holder and having a pin-receiving aperture, a pin arranged below said plate and engaging said aperture, tools for manipulating the foot and bowl of said article, means for heating the same, and lever mechanism adapted to engage said pin and to move said tools to and from said article, substantially as described.

6. The combination of central column, plates arranged at intervals apart thereon, flues supported upon the lower side and the upper side of the top and bottom ones of said plates respectively, holder for the article operated on carried by the intermediate one of said plates, heating and manipulating or working mechanism for the article, and pipes leading to the heating mechanism, substantially as set forth.

7. The combination of a central column, plates arranged at intervals apart thereon, flues supported upon the lower side and the upper side of the top and bottom ones of said plates, respectively, the intermediate one of said plates carrying means for holding the article operated on, one of said plates, with its flue, adapted to be adjustable upon said column to and from the other flue, and heating and manipulating mechanism for the foot and bowl of the article, substantially as set forth.

In testimony that I claim the foregoing I hereunto affix my signature this 25th day of April, A. D. 1895.

JNO. R. BRIDGES. [L. S.]

In presence of—
R. C. LOVERING,
I. S. SUNDAY.